United States Patent [19]
Fabbri

[11] Patent Number: 5,140,878
[45] Date of Patent: Aug. 25, 1992

[54] BAR-PUSHER ACTUATION DEVICE FOR BAR FEEDERS APPLIED TO MACHINE TOOLS

[75] Inventor: Vladimiro Fabbri, Faenza, Italy

[73] Assignee: I.E.M.C.A. S.p.A. Industria Elettromeccanica Complessi Automatici, Faenza, Italy

[21] Appl. No.: 577,167

[22] Filed: Sep. 4, 1990

[30] Foreign Application Priority Data

Sep. 8, 1989 [IT] Italy .................. 3615 A/89

[51] Int. Cl.$^5$ ............................................ B23B 15/00
[52] U.S. Cl. ........................................ 82/127; 414/18
[58] Field of Search .................... 82/124, 126, 127; 414/14, 17, 18

[56] References Cited

U.S. PATENT DOCUMENTS 2,630,909  3/1953  Mariotte .
3,799,363  3/1974  Ross .
4,019,411  4/1977  Bohn et al. .
4,068,546  1/1978  Werkmeister ................. 82/127
4,914,993  4/1990  Fabbri ....................... 82/127

FOREIGN PATENT DOCUMENTS 2587927  4/1987  France .
 267103  11/1988  Japan ......................... 82/127

Primary Examiner—Daniel W. Howell
Attorney, Agent, or Firm—Guido Modiano; Albert Josif

[57] ABSTRACT

The bar-pusher actuation device for bar feeders applied to machine tools includes a linear actuator composed of a chain with which the bar-pusher is associated and which is closed around a pair of fixed pinions and a pair of gearwheels which are movable with respect to the pinions. The pair of gearwheels is mounted on a slider which is slidable parallel to the direction of advancement of the bar. The slider is actuated by a jack adapted to perform a reciprocating stroke which substantially corresponds to the length of the portion of bar to be machined.

7 Claims, 4 Drawing Sheets

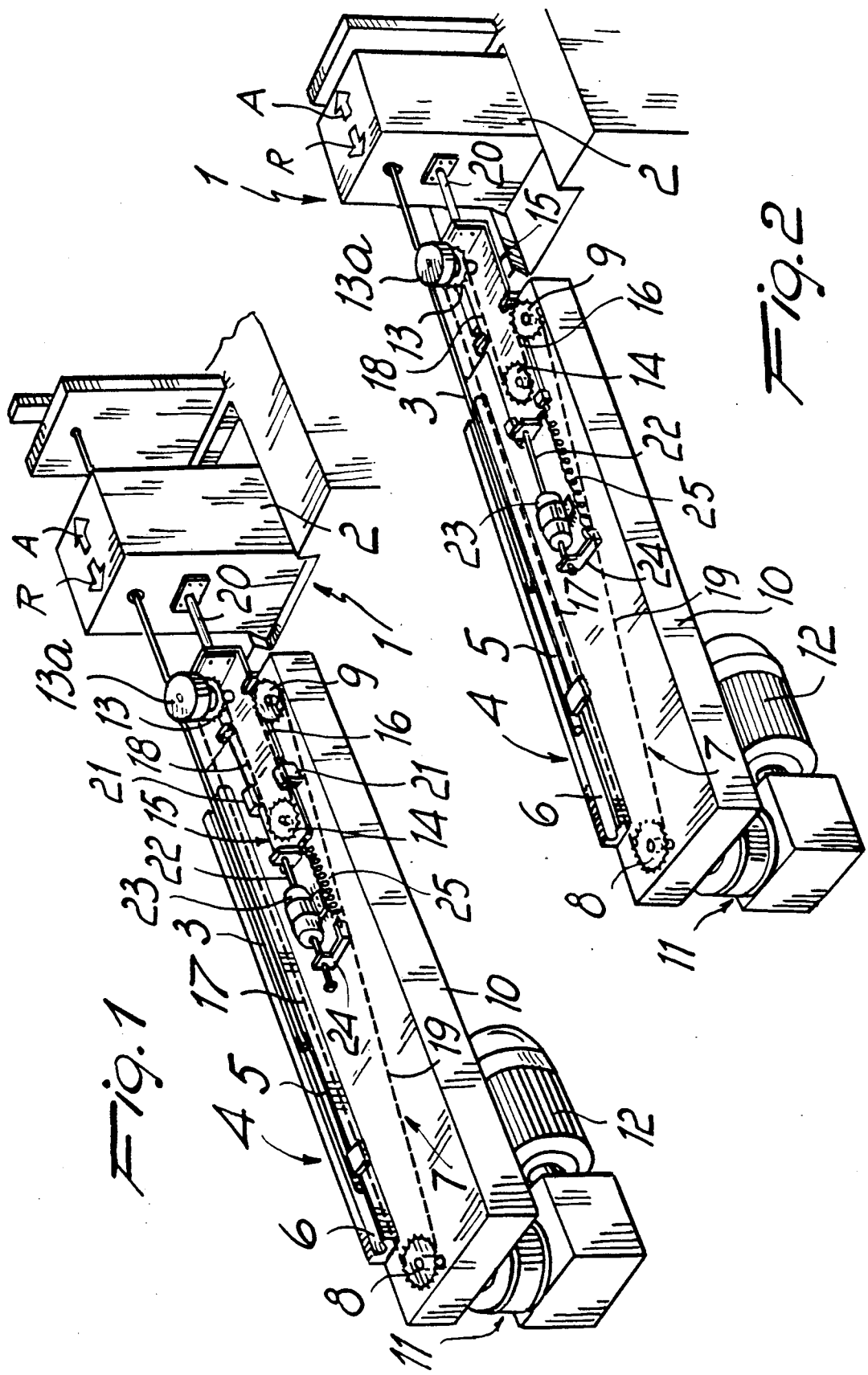

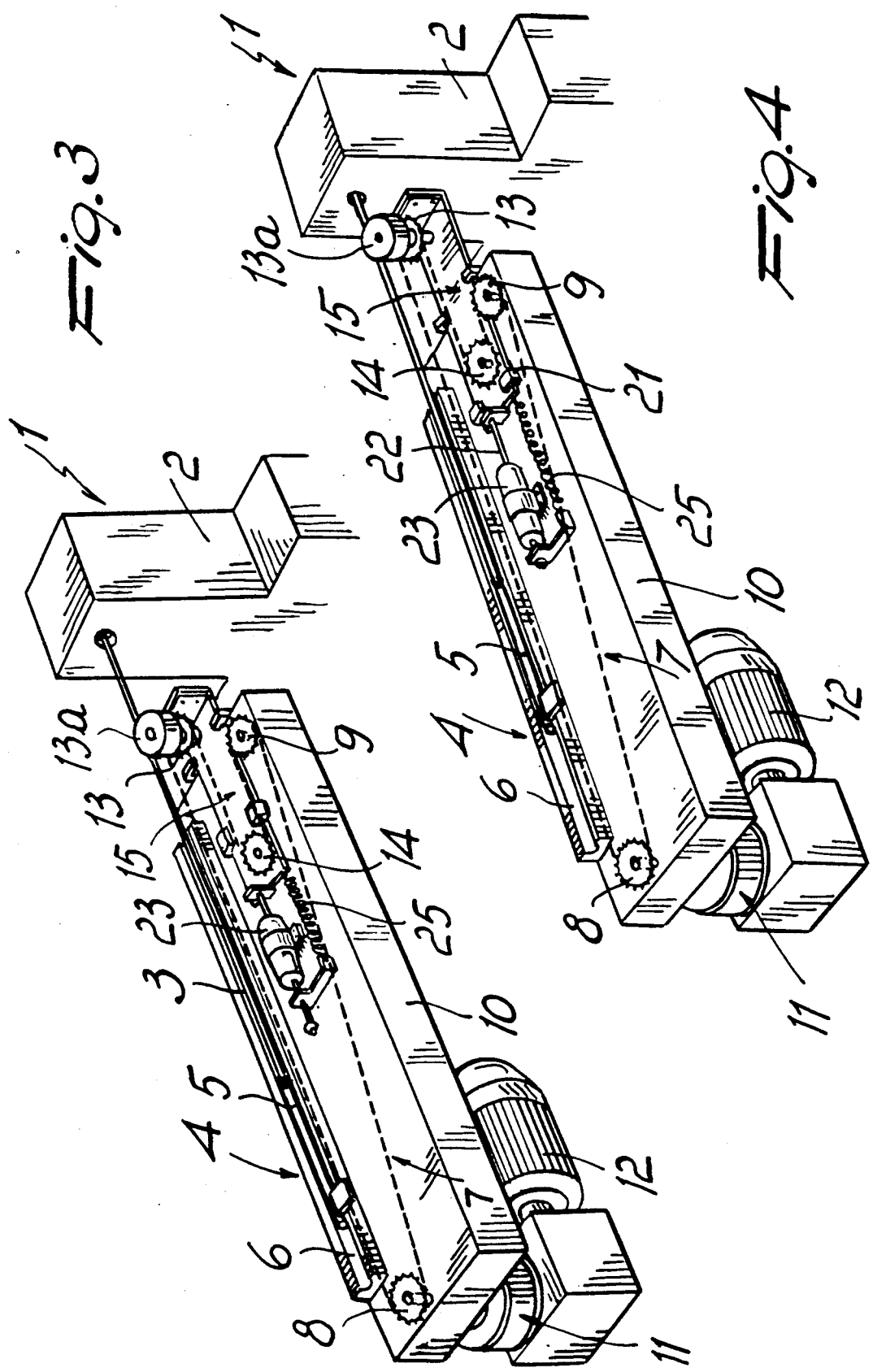

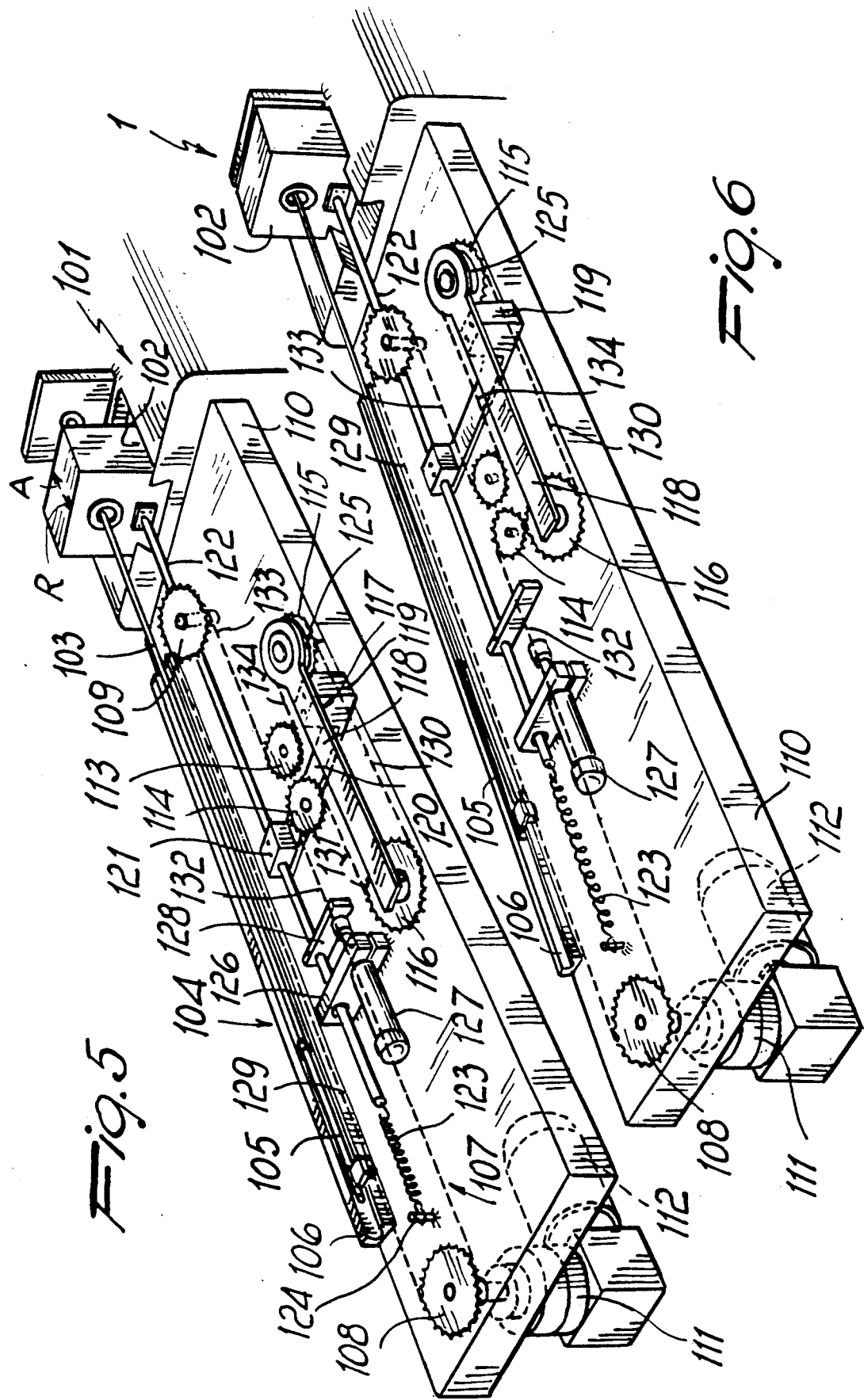

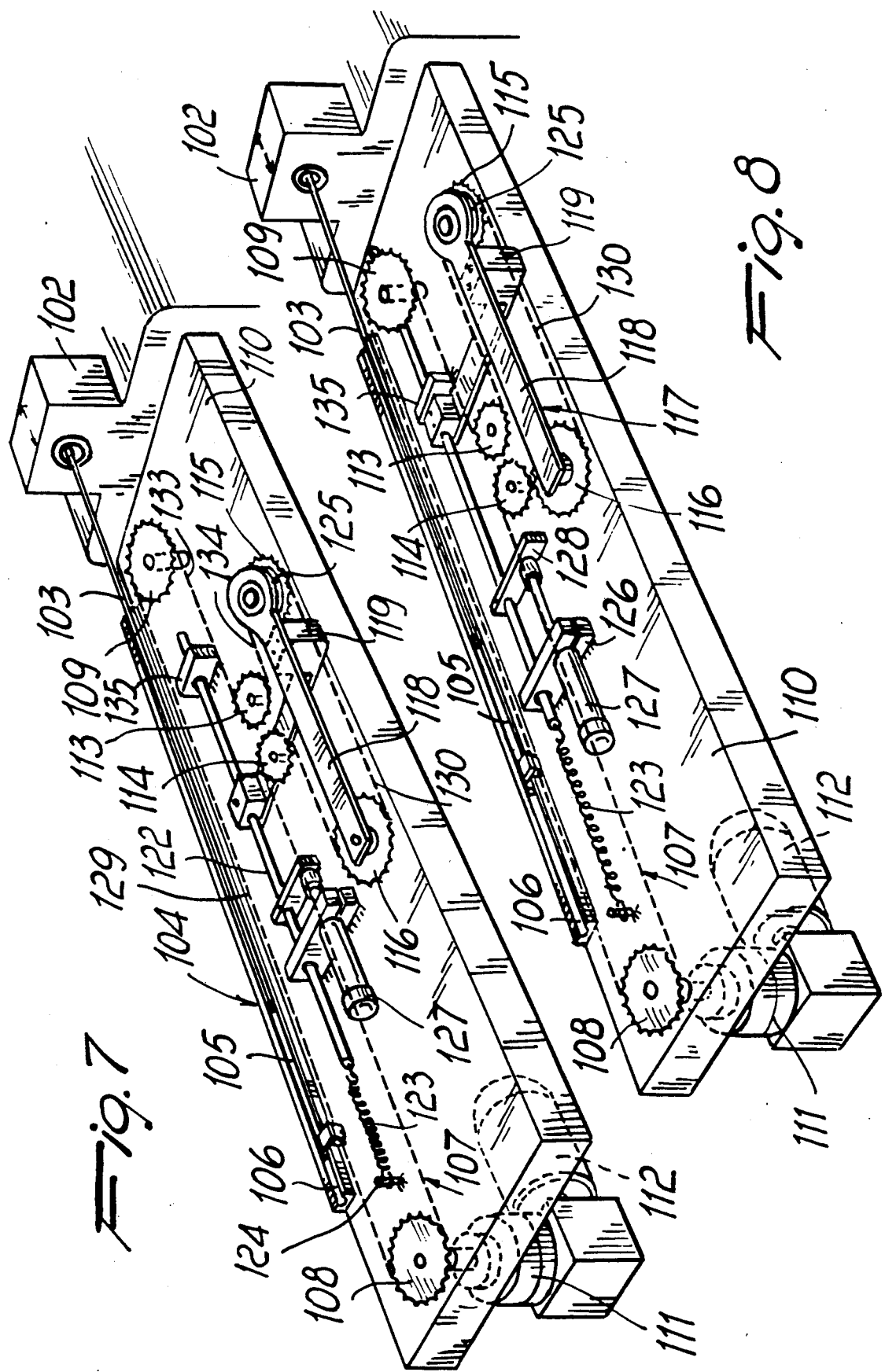

5,140,878

BAR-PUSHER ACTUATION DEVICE FOR BAR FEEDERS APPLIED TO MACHINE TOOLS

BACKGROUND OF THE INVENTION

The present invention relates to a bar-pusher actuation device for bar feeders applied to machine tools, in particular lathes equipped with a movable or fixed head.

In fixed-head lathes, after the front part of the bar has been inserted in the head and moved to the required point (usually for a facing operation), the lathe begins its working cycle: the chuck of the head opens and the bar must advance by a certain and precise length. The working cycle begins once the chuck is closed.

In normal feeders, the bar is pushed forward until it abuts an appropriate bar-stopper, and after this the thrust can continue until the new advancement occurs or can be discontinued during the working cycle and be restored at the end of the cycle.

This operation has several disadvantages:
a) a bar-stopper, which is an often complicated and bulky element, has to be mounted on the lathe;
b) the bar, in advancing, collides against the bar-stopper and can rebound, causing variations in the lengths of the part.

If the operation is of a continuous push type, besides the already mentioned disadvantages, small-diameter bars flex and cause other disadvantages: vibrations, noise, wear of the bars.

As regards automatic lathes of the so-called movable-head type, it is possible to move the bar, to be machined, forward or backward.

The feeding of the bar into the head is caused by the bar-pusher of the feeder, which is actuated by a linear actuator which comprises a chain moved by a drive unit.

During the machining, the bar held by the head moves in both directions, in particular in the direction opposite to the advancement direction, so that a thrust against the bar-pusher is exerted and forces said bar-pusher to move backward. In particular when the bars have a small diameter, it often occurs that the pressure exerted by the head on the bar being machined causes its deformation or at least a nonrecoverable stress inside the guiding channel.

SUMMARY OF THE INVENTION

The aim of the present invention is to provide a device which can be applied both to movable-head machine tools and to fixed-head ones and provides a step by step advancement of the bar, avoiding axial stresses on the bar which might cause a deformation thereof.

Within the scope of this aim, an object of the present invention is to provide a structurally simple device having a highly reliable operation.

This aim and this object are achieved, according to the invention, by a bar-pusher actuation device for bar feeders applied to machine tools, characterized in that it comprises a linear actuator composed of a chain which supports the bar-pusher and is closed around a pair of fixed pinions and a pair of gearwheels which are movable with respect to said pinions and are mounted on a slider which is slidable on a frame parallel to the direction of advancement of the bar, means being provided for actuating said slider with a reciprocating stroke which substantially corresponds to the length of the bar portion to be machined.

BRIEF DESCRIPTION OF THE DRAWINGS

Further advantages and characteristics of the present invention will become apparent from the following description of two preferred embodiments, illustrated only by way of non-limitative example in the accompanying drawings, wherein:

FIG. 1 is a schematic view of a device applied to a machine tool of the movable-head type in the maximum backoff position;

FIG. 2 is a view of the device of FIG. 1 with the head in the maximum forward position;

FIG. 3 is a schematic view of a device applied to a machine tool of the fixed-head type in the maximum backoff condition;

FIG. 4 is a view of the device of FIG. 3 in the configuration of bar advancement;

FIG. 5 is a schematic view of a variated embodiment of a device applied to a machine tool of the movable-head type in the maximum backoff position;

FIG. 6 is a view of the device of FIG. 5 with the head in maximum forward position;

FIG. 7 is a schematic view of a variated embodiment of a device applied to a machine tool of the fixed-head type in the maximum backoff condition;

FIG. 8 is a view of the device of FIG. 7 in the configuration of bar advancement.

DESCRIPTION OF THE PREFERRED EMBODIMENTS

With reference to the above figures, the reference numeral 1 indicates a generic automatic lathe 2 of the movable head type for machining a bar 3 fed by a magazine 4.

In the following description, the head 2 is assumed to be provided with rotatable chuck means (not illustrated since they are known) which can grip the bar and allow its rotation.

The head 2 is furthermore subjected to a reciprocating rectilinear movement, by means of the kinematic systems of the lathe 1, in both directions, A indicating the advancement direction and R indicating the backoff direction of said head.

The bar 3 is pushed toward the lathe 1 by a bar-pusher 5 which is a part of a linear actuator and slides in the guiding channel 6 of the magazine 4, the remainder of which is not illustrated in detail since it is fully conventional.

In a known manner, in this type of magazine the bar-pusher 5 is fixed along one edge to a chain 7 which is closed around a pair of pinions 8, 9 which are respectively supported at the opposite ends of the frame 10 of the magazine.

The pinion 8 receives its motion by means of a clutch 11 from a gearmotor 12 for driving the portion of chain 7 to which the bar-pusher 5 is coupled in the same direction A of advancement of the head 2.

The clutch 11 is conveniently set to such a value that when the advancement motion of the chain 7 is interrupted the clutch slips.

The chain 7 has such a length as to be able to define a winding path around a pair of gearwheels 13, 14 which are rotatably mounted on a slider 15 which is guided on the frame 10 parallel to the bar 3. The gearwheel 13 can be rotationally locked by means of a known locking device hereinafter termed brake 13a. The pinions 8, 9 and the gearwheels 13, 14 are arranged with respect to one another so as to define parallel portions 16, 17 connected by portions 18, 19. The portions 16, 18 extend from the gearwheel 14 to the pinion 9 and respectively to the gearwheel 13, whereas the portions 17, 19 extend from the pinion 8 to the gearwheel 13 and respectively to the pinion 9. Therefore, by moving the slider 15 with respect to the frame 10, the variation in the length of the portion 16 due to the approach or backoff of the pinion 9 with respect to the gearwheel 14 is compensated by the simultaneous backoff and respectively approach of the pinion 8 with respect to the gearwheel 13.

The slider 15 is connected, at one end, to the movable head 2 by means of a rigid bar 20 and is conveniently guided in the direction of sliding of the head by lateral guides 21. The stem 22 of a pneumatic or fluid-actuated jack is coupled to the opposite end of the slider 15, and its cylinder 23 is fixed on the frame 10. The axis of the jack is parallel to the direction of sliding of the slider 15.

An L-shaped element 24 is furthermore fastened to the frame 10, and the end of a traction spring 25 is hooked thereto; the opposite end of said spring is hooked to the slider. The L-shaped element 24 is advantageously provided with means for adjusting the traction force of the spring 25.

If the device according to the invention is mounted on a fixed-head machine tool (FIGS. 3 and 4), the slider 15 is not connected to the head 2 and can slide on the frame 10 independently of the head.

The operation of the described device is as follows.

The head 2 is assumed to be in the maximum backoff position (FIG. 1). The motor 12, by means of the clutch 11, causes the rotation of the pinion 8, which drives the chain 7 in the advancement direction A, so that the bar-pusher 5 advances with it and carries a bar 3 along the channel 6 and inserts it in the head 2 until the front end of the bar meets a bar-stopper abutment which determines the length of the portion of bar to be machined. At this point the chuck of the head 2 is closed so as to lock the bar 3.

The machining of the bar 3 is then performed; during this machining, the head performs a movement in the directions A and R according to a rule set by the type of machining required. The motor 12 remains active, so that a constant thrust is exerted on the bar 3 by means of the clutch; however, as will become apparent hereinafter, said thrust is neutralized by locking the gearwheel 13 by means of the brake 13a during the machining. Since the slider 15 is forced to follow the movement of the head 2, when said head moves in the direction R (see FIG. 2), the gearwheel 14 and the pinion 9 in fact move mutually apart, whereas the pinion 8 moves closer to the gearwheel 13.

In this manner, the portion 16 which increases in length is compensated by the decrease in length of the portion 17 of the chain. Therefore, since the bar-pusher 5 is coupled to the portion 17 of the chain, it performs a forward and backward motion which is concordant with the motion of the head 2 and avoids axial stresses on the bar 3 for all the time during which the bar remains locked in the head. As soon as the bar is released in the head, the brake 13a is also released and the bar-pusher can again act on the bar, causing its further advancement.

If the described device is mounted on a machine tool of the fixed-head type (FIGS. 3 and 4), the bar 3 is inserted in the head by the advancement of the bar-pusher for the preset length. Then, after locking the bar in the internal chuck of the head, the motor 12 is deactivated and the pinion 8 is freed by deactivating the clutch 11. The gearwheel 13 is simultaneously locked by means of the brake 13a and the jack 23 is activated. In this manner, after completing the machining of the part and removing it with the opening of the head's chuck, the jack 23 pushes the slider for an appropriately set extent which corresponds to the stroke of the stem 22.

Since the gearwheel 13 is locked, the movement of the slider 15 causes an equal movement of the bar-pusher 5 and therefore the insertion in the head of a new portion of bar to be machined.

When the stem 22 has reached the end of its stroke and the chuck of the head has closed on the new bar portion, the jack 23 is deactivated, allowing the spring 25 to return the slider to the initial position.

The cycle can be repeated until the bar is fully used up according to the above described method.

It is apparent that the described device, applied to fixed-head machines, requires no abutment for the bar, thus providing a considerable constructive simplification.

The length of the bar sections inserted in the head is more precise, since bar rebound phenomena, as in conventional machines provided with a bar-stopper, do not occur. Furthermore, an important advantage of this device is that when it is associated with movable-head machines, axial loads on the bar, and therefore the possibility of flexing during the backoff of the head, are prevented.

FIGS. 5–8 illustrate embodiments which allow to reduce the length and height of the device.

In FIGS. 5–8, the reference numerals 101 to 112 indicate the same elements indicated by the respective numerals 1 to 12 in FIGS. 1–4. The differences consist of the fact that the chain 107 has such a length as to be able to define a winding path around a pair of toothed sprockets 113, 114 and a pair of gearwheels 115, 116.

The sprockets 113, 114 are fixed to the upper face of the frame 110, whereas the gearwheels 115, 116 are supported by a slider 117.

The slider 117 substantially comprises an arm 118 which is parallel to the direction A and is rigidly associated with one end 119 of a second arm 120 which is perpendicular to the first arm.

The opposite end 121 of the arm 120 defines a clamp which is closed on a rod 122 which is parallel to the bar 103 and has an end fixed to the head 102. An end of a traction spring 123 is connected by means of a hook to the other end of the rod 122, and the opposite end of said spring is hooked to a pin 124 which is fixed to the frame 110.

The gearwheel 115 can be rotationally locked by an electromagnetic or mechanical brake or coupling 125.

The rod 122 is guided in a block 126 which is fixed on the frame 110 and on which the cylinder of a single-action jack 127, parallel to the rod 122, is mounted; the stem of said jack is rigidly connected by a cross-member 128 to the rod 122, so that by actuating the jack 127 the rod 122 is moved and the slider 117 thus slides in the direction which is parallel to the direction of motion of the bar 103.

The pinions 108, 109, the sprockets 113, 114 and the gearwheels 115, 116 are arranged mutually symmetrically and so as to define portions 129, 130 which are parallel and are connected by portions 131, 132, 133, 134 which are also mutually parallel in pairs and are parallel to the first portions 129, 130.

The portion 129 extends externally between the two fixed pinions 108, 109, whereas the portion 130 extends externally between the gearwheels 115, 116.

The other two sprockets 113, 114 are respectively along the portion of chain 107 comprised between the pinion 108 and the gearwheel 116 and between the pinion 109 and the gearwheel 115, defining the portions 131, 132, which extend from the sprocket 114 to the pinion 108 and to the gearwheel 116, and the portions 133, 134, which extend from the sprocket 113 to the pinion 109 and to the gearwheel 115.

Therefore, by moving the slider 117 with respect to the frame 110, the lengthening or shortening of the portion 131 corresponds respectively to a shortening or lengthening of the portion 134.

If the device according to the invention is mounted on a fixed-head machine tool (FIGS. 7 and 8), the rod 122 is not connected to the head 102, but its end slidably passes through a block-shaped support 135 which is rigidly associated with the frame 110 and on the rod 122. In this case the slider 117 is actuated so as to slide on the frame 110 independently of the head 102.

The operation of the described device is similar to the previous one. In particular, after inserting and locking the bar 103 in the head 102, while said head performs a movement in the directions A and R according to a rule set by the type of machining required, the motor 112 remains active and exerts a constant thrust on the bar 103 by means of the clutch 111; said thrust is however neutralized by locking the gearwheel 115 by means of the brake 125, during the machining. Since the slider 117 is forced to follow the movement of the head 102, when said head moves in the direction R (see FIG. 6), the gearwheel 116 and the pinion 114 in fact move mutually apart, whereas the gearwheel 115 moves closer to the pinion 113.

In this manner, the portion 131 which increases in length is compensated by the decrease in length of the portion 134.

Therefore the bar-pusher 105 . being fastened to the portion 129 of the chain, performs a forward and backward movement which is concordant with that of the head 102 and, by virtue of which, axial stresses on the bar 103 are avoided for all the time during which the bar remains locked in the head. As soon as the bar is released in the head, the brake 125 is also released and the bar-pusher can again act on the bar, causing a further advancement thereof.

If the described device is mounted on a machine tool of the fixed-head type (FIGS. 7 and 8), after the locking of the bar in the internal chuck of the head the motor 112 is deactivated and the pinion 108 is freed by deactivating the clutch 111. The gearwheel 115 is simultaneously locked by means of the brake 125 and the jack 127 is activated. In this manner, after completing the machining of the part and removing it with the opening of the head's chuck, the jack 127 pushes the rod 122 and the slider 117 with it for an appropriately set extent which corresponds to the stroke of the stem.

Since the gearwheel 115 is locked, the movement of the slider 117 causes an equal movement of the bar-pusher 5 and therefore the insertion of a new section of bar to be machined in the head.

When the stem has reached its stroke limit and the chuck of the head has closed on the new section of bar, the jack 127 is deactivated, allowing the spring 123 to return the rod 122 together with the slider 117 to the initial position.

The cycle can be repeated until the bar is fully used up according to the above described method.

As can be seen, the described device extends only horizontally, thus allowing the arrangement of the inclined supporting plane of the bars above the frame 110 and causing a considerable reduction in the overall width of the machine tool.

A decrease in the length of the frame 110, and therefore of the feeder, is achieved by the particular path of the chain 107, which allows to eliminate the space between the frame 110 and the head 102 which is required in known devices to allow the movement of the slider 117.

In the device according to the invention, said slider in fact performs its reciprocating rectilinear stroke only along the portion comprised between the pinions 108 and 109.

I claim:

1. Bar-pusher actuation device for bar feeders applied to machine tools, comprising a linear actuator composed of a chain which supports the bar-pusher and is closed around a pair of fixed pinions and a pair of gearwheels which are movable with respect to said pinions and are mounted on a slider which is slidable on a frame parallel to the direction of advancement of the bar, means being provided for actuating said slider with a reciprocating stroke which substantially corresponds to the length of the bar portion to be machined.

2. Device according to claim 1, further comprising a frame, said pair of pinions being mounted on said frame, one of said gearwheels being lockable by means of a brake, said chain having portions extending between each of said pinions and a respective one of said gearwheels and being wound on sprockets, whereby to define a winding path in which the chain portions which extend between each of said sprockets and a respective one of said pinions and one of said gearwheels are parallel to a sliding direction of the slider, whereby variation in portions of chain which lengthen during movement of the slider is equal to variation in portions of chain which shorten.

3. Device according to claim 1, wherein one of said gearwheels can be rotationally locked by means of a locking device, said gearwheels and said pinions being arranged along a winding path so as to compensate the length variations between the portions of said chain which lengthen and those which shorten during the movement of the slider.

4. Device according to claim 1, comprising a movable head, said slider being rigidly connected to said movable head.

5. Device according to claim 1, wherein said slider is actuated by a jack which is interposed between said slider and said frame and has its axis parallel to the sliding direction of said slider.

6. Device according to claim 2, wherein said slider is connected to a rod, said rod being guided parallel to the direction of advancement of the bar.

7. Device according to claim 5, wherein said slider is connected to a rod, and wherein said jack is of the single-action type and has a stem connected to said rod, a spring being provided and acting on said rod to return said slider to its initial position.

* * * * *